J. CHASE.
Steam-Cooking Apparatus.

No. 197,512.     Patented Nov. 27, 1877.

Witnesses.    Inventor.
Edw? R. Amherst.   Jefferson Chase.
Louis A. Curtis    J. Curtis. Att'y

UNITED STATES PATENT OFFICE.

JEFFERSON CHASE, OF ORANGE, MASSACHUSETTS.

IMPROVEMENT IN STEAM COOKING APPARATUS.

Specification forming part of Letters Patent No. 197,512, dated November 27, 1877; application filed October 25, 1877.

*To all whom it may concern:*

Be it known that I, JEFFERSON CHASE, of Orange, Franklin county, Massachusetts, have invented certain Improvements in Steam Cooking Apparatus, of which the following is a specification:

The purpose of this invention is to provide a means for thoroughly and rapidly cooking large quantities of food, the use to which I intend putting it, mainly, being to prepare food in considerable quantities for animals, though it is applicable to hotel and other uses.

Figure 1:
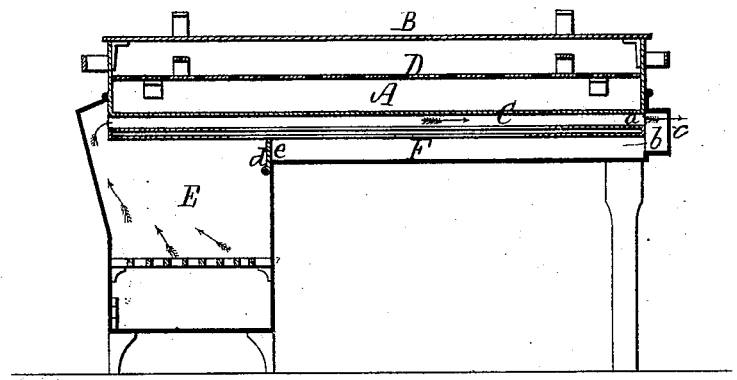
Figure 2:
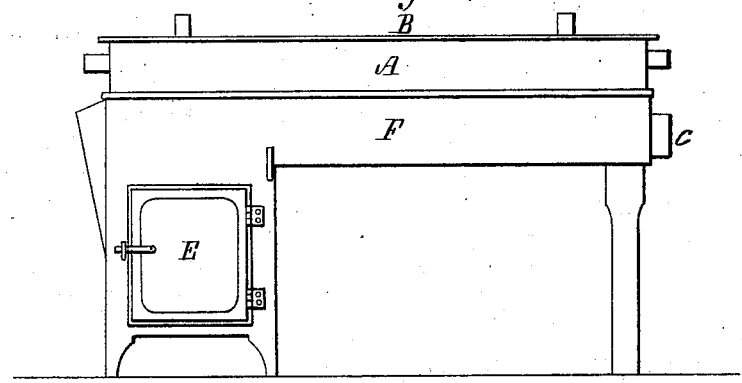
Figure 3:
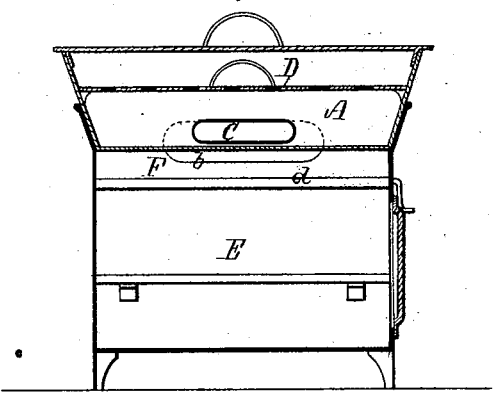

The drawings accompanying this specification represent, in Figure 1, a longitudinal vertical section, in Fig. 2 a side elevation, and in Fig. 3 a vertical cross-section, of a cooking apparatus embodying my invention.

In these drawings, A represents a large rectangular vessel or pan open at top, except when closed by a suitable cover, B, this pan being designed to hold the food to be cooked, and being provided with a horizontal flue, C, extending through it longitudinally, near its lower part, and with a horizontal foraminous or reticulated shelf, D, placed about midway of its height, the flue being for the passage of hot smoke and gases from the furnace when steam is to be generated in the pan, and the shelf being to receive the food, or vessels containing food, and raise the latter above and out of direct contact with the water in the lower part of the pan.

To obtain the necessary heat by which to vaporize the water in the pan A, I provide a suitable furnace, which is shown at E, as making part of a frame or support for the pan A, which is placed above such furnace, a broad horizontal flue, F, extending the whole length and width of the said pan A, and below the latter the outlet $a$ of the flue C, making part of or discharging through the outlet $b$ of the last-named flue F, as shown in Fig. 1 of the drawings, while a branch or extension, $c$, of the said flue F connects the upper part of the furnace with the front end of the said flue C, as shown also in said Fig. 1.

A damper, $d$, is placed at the throat $e$ of the flue F, in order to open or close the same.

Food to be cooked is placed in bulk upon the top of the shelf D, or in vessels placed upon such shelf, and the cover B tightly closed, to prevent undue escape of steam from the interior of the pan, it being understood that a quantity of water is placed in the lower part of the pan, and covering the flue C, and the damper $d$ opened.

A fire being built in the furnace E, the smoke and hot gases and air from such fire pass upward and rearward, and traverse the flues C and F, and escape by the outlets $a$ and $b$ of such flues in the passage, giving up the heat to the water contained in the pan A, and vaporizing such water.

When the water in the pan A boils, the damper $d$ may be shut, as the heat impinging against the under side of the pan is sufficient to boil the water in the latter; and when the damper is closed, as stated, the smoke and gases escape through the outlet $b$ of the flue F, or so much of the latter as is not occupied by the outlet $a$ of the flue C.

The steam from the boiling water in the lower part of the pan A ascends, and envelops the food above the shelf D, and the boiling of the water is to be maintained until the food is cooked.

I claim—

1. The general combination of parts, as herein shown, consisting of the pan A, with its flue C and foraminous shelf D, the furnace E, and flue F, the whole being substantially as and for purposes stated.

2. The combination, with the pan A and furnace E, of the flues C and F, as herein shown, whereby the outlet of the flue F serves to allow of escape of smoke and gases both through such flue and the flue C, substantially as and for purposes stated.

JEFFERSON CHASE.

Witnesses:
S. C. ANDREWS,
E. P. PAYSON,
F. CURTIS.